United States Patent [19]

Iri et al.

[11] Patent Number: 4,779,949
[45] Date of Patent: Oct. 25, 1988

[54] CONNECTOR HAVING AXIALLY SLIT END FOR GRIPPING OPTICAL FIBER

[75] Inventors: Eiji Iri, Kawanishi; Masatoshi Tabira, Amagasaki; Tsuneo Kiriyama, Fujisawa; Nobutake Tanaka, Yokohama; Toshiaki Minaki, Sakura, all of Japan

[73] Assignees: Dainichi-Nippon Cables, Ltd., Hyogo; Nippon Mining Co., Ltd., Tokyo, both of Japan

[21] Appl. No.: 846,794

[22] Filed: Apr. 1, 1986

[30] Foreign Application Priority Data

Apr. 5, 1985 [JP] Japan .............................. 60-51606[U]
Oct. 29, 1985 [JP] Japan ............................ 60-167304[U]
Dec. 12, 1985 [JP] Japan ............................ 60-191711[U]
Dec. 12, 1985 [JP] Japan ............................ 60-191713[U]

[51] Int. Cl.⁴ .............................................. G02B 7/26
[52] U.S. Cl. .................................. 350/96.21; 350/96.20
[58] Field of Search ............... 350/96.20, 96.21, 96.22, 350/96.23

[56] References Cited

U.S. PATENT DOCUMENTS

| | | | |
|---|---|---|---|
| 4,185,886 | 1/1980 | Corrales | 350/96.21 |
| 4,279,466 | 7/1981 | Makuch et al. | 350/96.21 |
| 4,478,487 | 10/1984 | Obeissart | 350/96.20 X |

FOREIGN PATENT DOCUMENTS

| | | | |
|---|---|---|---|
| 0156397 | 10/1985 | European Pat. Off. | 350/96.20 |
| 0202422 | 11/1984 | Japan | 350/96.20 |
| 0201308 | 10/1985 | Japan | 350/96.20 |
| 2096348 | 10/1982 | United Kingdom | 350/96.20 |

*Primary Examiner*—Gene Wan
*Attorney, Agent, or Firm*—Burns, Doane, Swecker & Mathis

[57] ABSTRACT

This invention relates to a connector for optical fiber used for optical communication parts, especially to a plug of the connector, comprising an inner tube into which an endportion of an optical fiber cord, whose cover is peeled off, is inserted and which is formed with axial slittings; and an outer tube being fitted onto the inner tube and made of a solid material, the inner tube being reduced in diameter at the portion having the slittings, thereby fixing the optical fiber thereto.

22 Claims, 7 Drawing Sheets

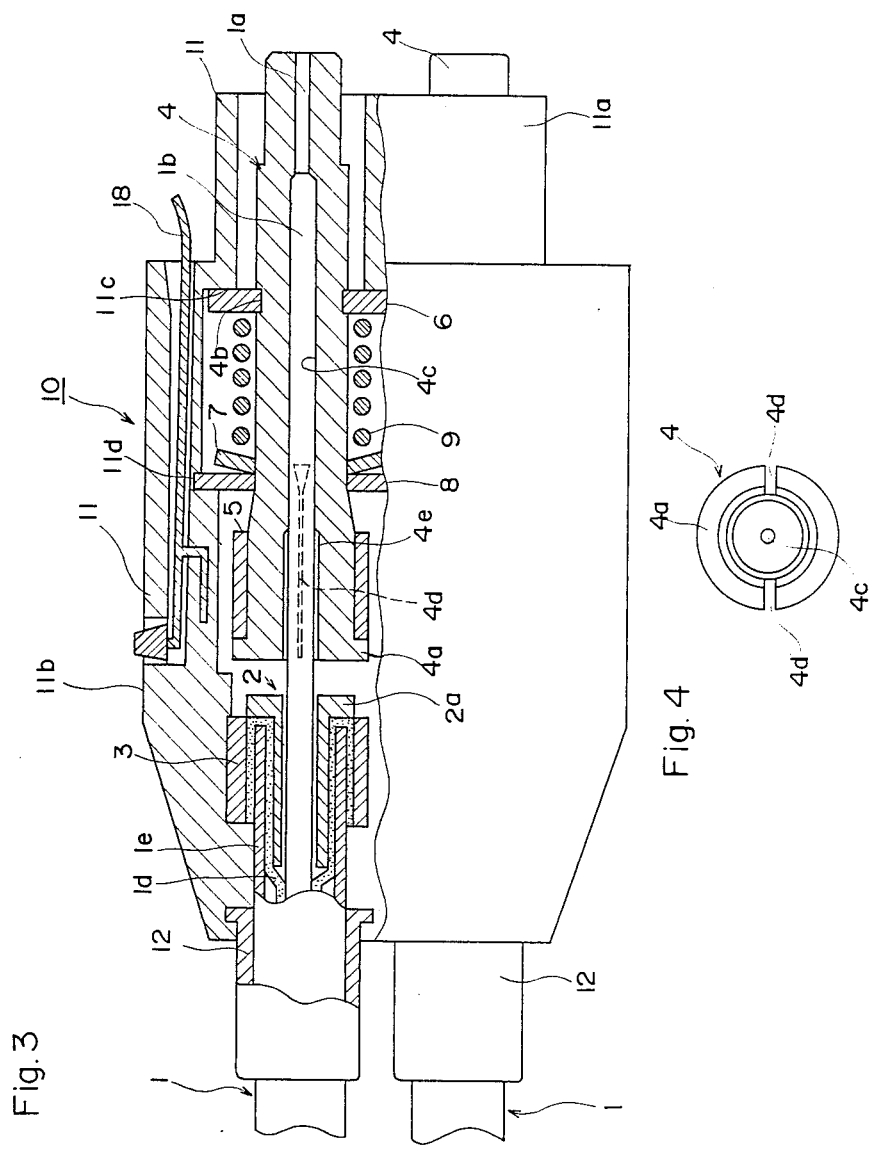

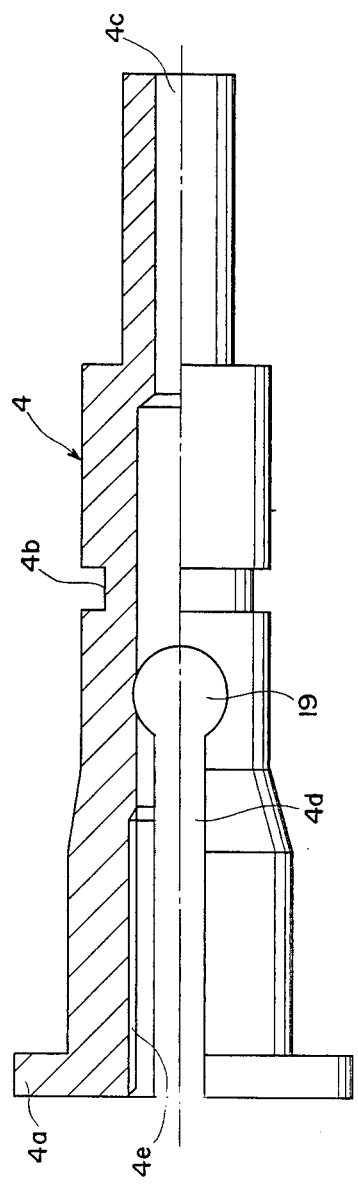
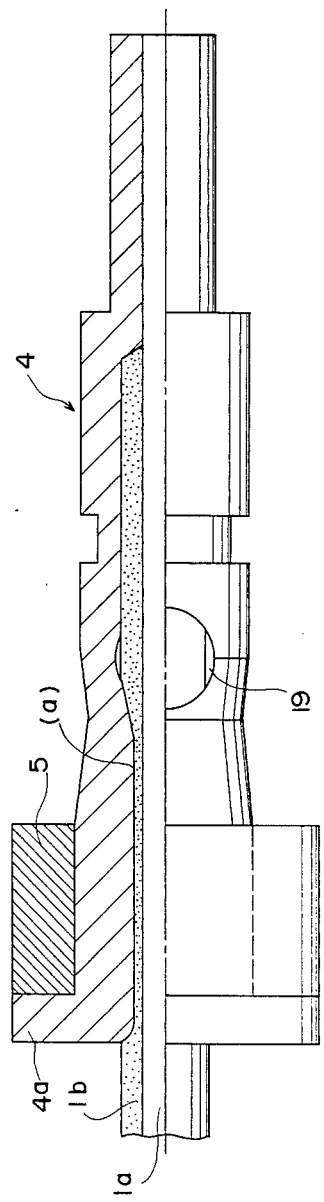

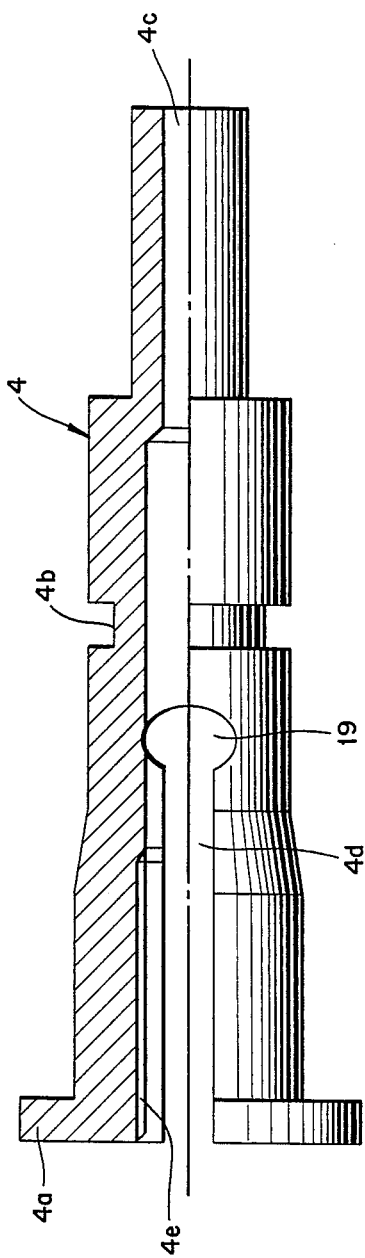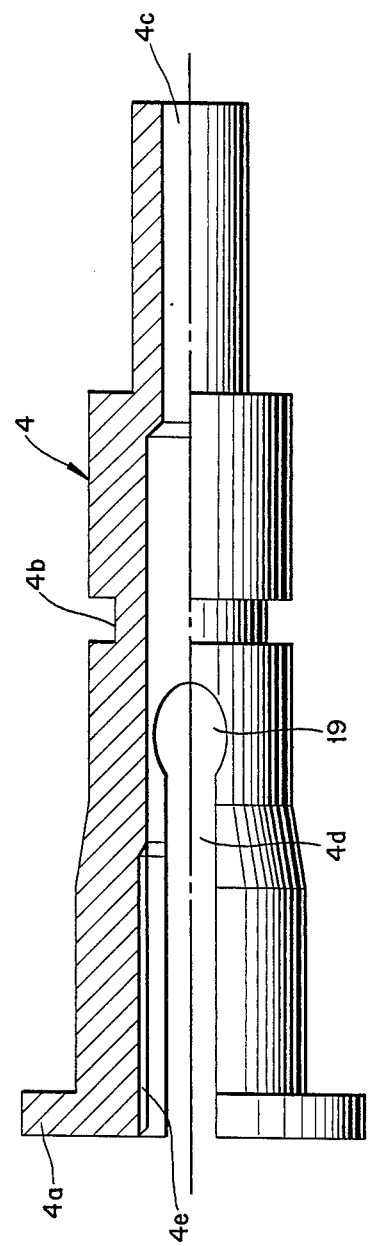

CONNECTOR HAVING AXIALLY SLIT END FOR GRIPPING OPTICAL FIBER

BACKGROUND OF THE INVENTION

1. Field of the Invention

The present invention relates to a connector for optical fiber used for an optical communication part, such as an optical data link.

2. Description of the Prior Art

FIG. 1 is a schematic structural view of a connector for optical fiber, in which reference numeral 10 designates a plug and 13 designates a module provided with a receptacle 14, the module 13 comprising the receptacle 14, internal optical elements 15 and 16 therein, and an electronic circuit being connected with these components. Optical fiber cords 1 are connected either separately or in a bundle to other apparatus and connected at the ends to the plug 10. In other words, the utmost end of each optical fiber cord 1 is bared of its cover and fitted into each metallic ferrule 4 serving to protect the bared portion of the cord 1. The ferrules 4 each project at a moderate length from a housing 11 at the plug 10 which restrains and holds therein the base ends of optical fiber cords 1 or ferrules 4.

The projecting ferrules 4 are inserted through projections 11a attached to the housing 11 and somewhat project from the projections 11a respectively.

The projections 11a are inserted into a housing 17 at the receptacle 14 and optical fibers inserted into the ferrules 4 abut against optical elements 15 and 16 within the module 13 fitted to the receptacle 14.

The module 13 contains therein the opto-electrical transfer element 15 and electro-optical transfer element 16 which are juxtaposed with each other and held to the module 13, the elements 15 and 16 being connected to the receiving side circuit and the transitting side circuit (which are not shown) respectively.

FIG. 2 is a partially cutaway plan view of the conventional plug 10. A rubber boot 12 is fitted onto the end of each optical fiber cord 1, the ends of cords 1 being fitted into the housing 11 at the connector plug 10.

The optical fiber cord 1 comprises optical fiber 1a having a cladding of polymer series and a core of quartz, the optical fiber 1a being sleeved with a nylon jacket 1b and further with a sheath 1e of P.V.C. or the like. Also, the optical fiber cord 1 within the housing 11 is bared from the end of sheath 1e of a jacket 1b of nylon.

The optical fiber 1a is bared at a portion from the utmost end of the bared jacket 1b, so that the ferrule 4 is fitted onto the utmost end of the sheath 1e, the jacket 1b bared from the utmost end thereof, and the optical fiber 1a bared from the utmost end of the jacket 1b. The ferrule 4 forms a flange 61 at the base and is reduced in diameter in a stepping manner at the outer periphery of an intermediate portion.

A through bore 62 is formed at the axis of the ferrule 4 and reduced in diameter at an intermediate portion in a stepped manner to thereby be tapered toward the utmost end. The utmost end of the sheath 1e of the optical fiber cord 1 is fitted into the root of the through bore 62, both the ferrule 4 and cord 1 being fixed with silicon resin or epoxy resin 64. The jacket 1b bared of the sheath 1e from the utmost end and the optical fiber 1a bared of the jacket 1b from the utmost end are inserted into the through bore 62, the end face of the optical fiber 1a being level with the end face of ferrule 4 and facing the exterior. The utmost end of the through bore 62 at the ferrule 4 and the utmost end of the optical fiber 1a are fixed to each other with silicon resin or epoxy resin 65.

Onto the root of the ferrule 4, a tubular member 71 is fixedly fitted and a washer 74 of a leaf spring is slidably fitted, the tubular member 71 forming a flange at one end at the optical fiber 1a end side and abutting at the other end against a flange 61 at the ferrule 4. Meanwhile, a holder 72 is fixedly fitted into the groove at an intermediate portion of the ferrule 4 and being mounted in the housing 11 and a cushion 73 is interposed to be compressed longitudinally between the holder 72 and the washer 74 so that the entire ferrule 4 is biased by the cushion 73 in the direction of projecting (in the right direction of FIG. 2) from the housing 11.

The aforesaid connector for optical fiber fixes the sheath 1e for the optical fiber cord 1, jacket 1b and ferrule 4, and the optical fiber 1a and ferrule 4, by using an adhesive, such as silicon resin or epoxy resin, whereby not only it takes much time to cure the adhesive but also the long-term reliability thereof is poor. Also, the processing for the connector is that the adhesive is leaked from between the optical fiber 1a and the ferrule 4 and attached onto the utmost end face of the optical fiber 1a to be cured, and thereafter the leaked adhesive is polished and removed, thereby creating a problem in that the polishing process takes much time and the terminal treatment is troublesome. In addition, the conventional terminal treatment takes 30 to 40 minutes.

OBJECTS OF THE INVENTION

In the light of the above problems, the present invention has been designed.

A first object of the invention is to provide a connector for optical fiber which need not use the adhesive and take a time for curing it, thereby largely simplifying a work for fixing the optical fiber to the connector to result in that the workhour therefore is largely reduced.

A second object of the invention is to provide a connector for optical fiber which comprises an inner tube having slittings and an outer tube which is fitted thereon, the outer being fitted on the inner tube thereby reducing in diameter the inner tube and fixing optical fiber in the inner tube, thereby fixing the optical fiber firmly and needing no skill.

A third object of the invention is to provide a connector for optical fiber which fixes optical fiber firmly and is quite free from a projection or a retraction of the optical fiber.

A fourth object of the invention is to provide a connector for optical fiber which fixes the optical fiber thereby reducing an optical loss within an allowable value.

A fifth object of the invention is to provide a connector for optical fiber provided at the inner periphery of a ferrule with a screw thread, thereby ensuring the fixing of the optical fiber.

A sixth object of the invention is to provide a connector for optical fiber which forms bores at the fore ends of slitting portions thereby making flat a jacket biasing portion and firmly fixing the optical fiber.

A seventh object of the invention is to provide a connector for optical fiber which forms bores at the fore ends of slitting portions, thereby making flat a jacket biasing portion so as not to apply a local force on the optical fiber.

An eighth object of the invention is to provide a connector for optical fiber which ensures fixing of the optical fiber by shifting longitudinally the jacket and the buffer layer or the cladding layer provided at an optical fiber cord and biasing them all together.

A ninth object of the invention is to provide a connector for optical fiber which inserts the end of optical fiber into a small tubular member and fits it into another tubular member, whereby the optical fiber withstands a drawing force.

A tenth object of the invention is to provide a terminal structure of an optical fiber cord which need not use an adhesive for a fixing work in a connector for optical fiber, thereby simplifying the work and reducing a workhour.

An eleventh object of the invention is to provide a terminal structure for an optical fiber cord which folds back onto a sheath a fiber member bared thereof and fits a calking member onto the folded fiber member, thereby ensuring fixing of the fiber member onto the sheath.

A twelfth object of the invention is to provide a terminal structure for an optical fiber cord which folds back onto a sheath a fiber member bared thereof and fits a calking member onto the folded fiber member, thereby ensuring fixing of the fiber member onto the sheath, not fixing an optical fiber.

BRIEF DESCRIPTION OF THE DRAWINGS

FIG. 3 is a partially cutaway plan view of a plug at a first embodiment of a connector for optical fiber of the invention, FIG. 4 is a front view of a ferrule in the plug of the connector for optical fiber of the invention when viewed from the fore end of the ferrule, FIG. 5 is a half-sectional view of a ferrule at a second embodiment of a connector for optical fiber of the invention, FIG. 5a illustrates an elliptical bore elongated in the radial direction; FIG. 5b illustrates an elliptical bore elongated in the axial direction;

FIG. 6 is a half-sectional view of the second embodiment of the connector for optical fiber of the invention, showing a fixing state thereof.

DETAILED DESCRIPTION OF THE INVENTION

Figure 1:
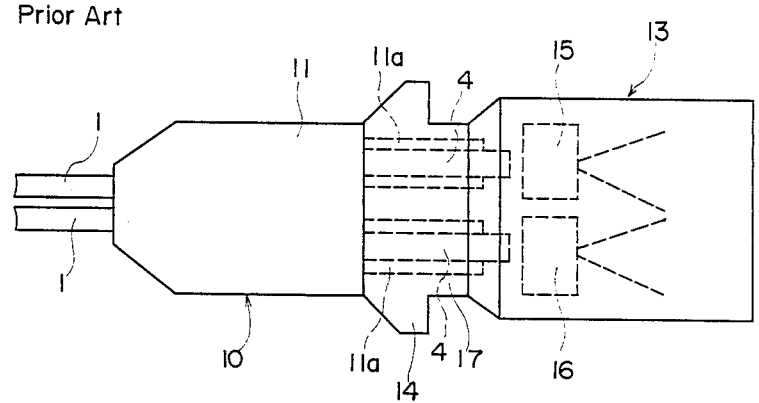
FIG. 1 is a schematic structural view of a connector for optical fiber.
Figure 2:
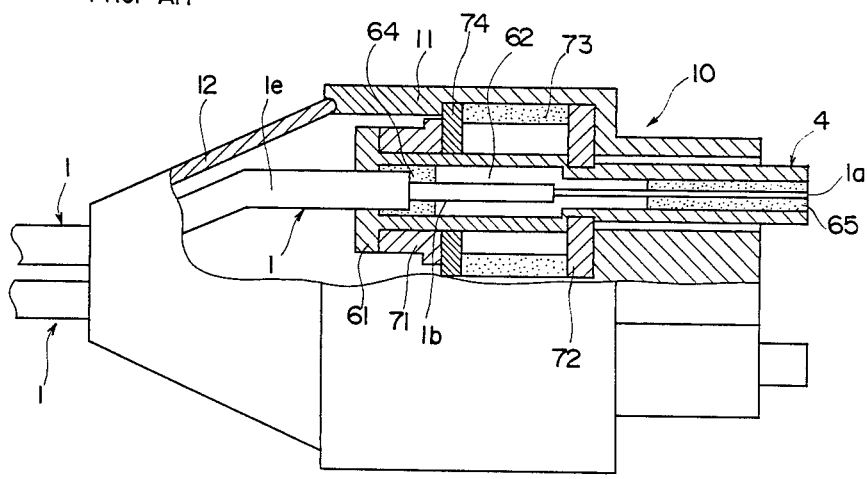
FIG. 2 is a partially cutaway plan view of a conventional plug.

Next, a first embodiment of a connector for optical fiber of the invention will be described. In FIG. 3, reference numeral 10 designates a connector plug mounted on one ends of two optical fiber cords 1 and rubber boots 12 are fitted onto the cords 1 respectively, the utmost end of the rubber boots 12 being fixed in a housing 11. The housing 11 divides into two pieces at the center of the optical fiber cords 1, and each piece is fitted together with a bolt and a nut.

The optical fiber cords 1 each comprise polymer clad quartz optical fiber $1a$ onto which a nylon jacket $1b$ is fitted, an aramid fiber member $1d$ being fitted on the outer periphery of the jacket $1b$, and a sheath $1e$ of P.V.C. fitted onto the fiber member $1d$. And a cover of said optical fiber cord comprises a jacket $1b$, a fiber member $1d$ and a sheath $1e$.

In each rubber boot 12 at the plug 10, the jacket $1b$ at the optical fiber cord 1 is bared of the fiber member $1d$ and sheath $1e$, the fiber member $1d$ being bared thereof so that its bared portion is folded back on the outer periphery of the end of sheath $1e$. A metallic tubular member 2 is interposed between the jacket $1b$ and the fiber member $1d$ at the end of sheath $1e$ and has at one end a flange $2a$, the flange $2a$ abutting against the sheath $1e$ through the fiber member $1d$.

A caulking tube 3 is fitted onto the fiber member $1d$ folded back at the end of the sheath $1e$ into which the tubular member 2 is fitted, the caulking tube 3 being caulked, whereby the folded back fiber member $1d$ is fixed to the sheath $1e$ between the tubular member 2 and the caulking tube 3.

The jacket $1b$ bared of the fiber member $1d$ and sheath $1e$ is fitted into the ferrule 4. The ferrule 4 is provided at the root of the sheath $1e$ side with a flange $4a$, the root is somewhat larger in an outer diameter than an intermediate portion tapered through a slope, and the utmost end portion is somewhat smaller in an outer diameter than the intermediate portion through a stepped portion, the intermediate portion being provided at the outer periphery thereof with a groove $4b$ extending on the entire or part of the outer periphery.

Also, the ferrule 4 is provided with an axially extending central through bore $4c$ which is reduced in diameter at the utmost end portion. The jacket $1b$ bared of the sheath $1e$ and fiber member $1d$ is inserted into the through bore $4c$ from the root thereof, the polymer clad quartz core optical fiber $1a$ is bared of the jacket $1b$ at the utmost end thereof and fitted into the small diameter fore end portion of the through bore $4c$, and the utmost end of optical fiber $1a$ faces the exterior.

Referring to FIG. 4, a pair of slittings $4d$ are formed from the root to the intermediate portion of the ferrule 4 and a screw thread $4e$ is provided at the inner periphery of the root of ferrule 4. A caulking tube 5 is fitted onto the root of ferrule 4 in relation of abutting at the end face against a flange $4a$. Inner diameter of the caulking tube 5 being shorter than outer diameter of the root of the ferrule 4, and being larger than outer diameter of the intermediate portion thereof. The caulking tube 5 is fitted onto the root of the ferrule 4, thereby reducing in diameter the slittings forming portion of the ferrule 4 and the jacket $1b$, thereby fixing the optical fiber $1a$ to the ferrule 4.

The end of the optical fiber cord 1 constructed as foregoing is mounted in the housing 11 at the connector plug 10. The housing 11 is almost rectangular parallel piped and has projections $11a$ being to be fitted to the receptacle, the base portion $11b$ of the housing 11 is trapezoid, and the caulking tube 3 fitted onto the sheath $1e$ fixedly engages with the base portion $11b$ of the housing 11, the rubber boots 12 also being fixed thereto.

The ferrule 4 projects at the utmost end thereof from the projection 11a of the housing 11 and a spring rest 6 is fitted into the groove 4b at the intermediate portion of ferrule 4 and abutted on the inner face 11c of the injections 11a side of the housing 11.

A washer 7 and a stop washer 8 are slidably fitted onto the intermediate portion of ferrule 4 at the base end side thereof and abutted on the stop washer 8 fitted to the groove 11d of the housing 11. Between the washer 7 and the spring rest 6, a compression spring 9 is interposed and fitted on the ferrule 4 so as to compress the spring rest 6 in the direction of the utmost end of the housing 11, thereby biasing the ferrule 4 outwardly from the projection 11a.

In addition, reference numeral 18 designates a lock spring for locking the plug 10 when plugged into the receptacle 14.

In such a connector plug 10, when in use, each projection 11a is fitted into the receptacle 14, and the end face of optical fiber 1a at each ferrule 4 abuts moderately against the light emitting and receiving elements 15 and 16 at the receptacle 14.

The polymer cladding quartz core optical fiber of core diameter of 250 μm and clad diameter of 450 μm is used to constitute the optical fiber connector plug of the invention and subjected to the repeatedly twenty heat-cycles (6 hours per cycle) at a temperature of −20° to 80° C., then no projection and no retraction of the optical fiber 1a from and into the ferrule 4 have been found and an increase in an optical loss has satisfactorily been kept 0.1 dB or less per one portion.

Referring to FIGS. 5 and 6, a second embodiment of the invention is shown, in which the slittings 4d at the ferrule 4 are formed from the base end thereof to the base end side of the intermediate portion and provided at the utmost end portion side of the same with a round bore 19 of a diameter larger than a width of each slitting 4d. A caulking tube 5, in the same way as the first embodiment, is fitted onto the ferrule 4 to contract the base portion of ferrule 4 having the slittings 4d, thereby fixing the jacket 1b to the optical fiber 1a.

In the first embodiment, when the slittings 4b are short the root portion of the ferrule 4 is not reduced in diameter being parallel to the optical fiber 1a so that the urged portion gathers on a restricted region at the inner periphery near the flange 4a, resulting in a fear of increasing microvents. The second embodiment, however, has a round or circular bore 19 at one end of each slitting 4b so as to allow the root portion of the ferrule 4 to be reduced in diameter being parallel to the optical fiber 1a and the inside of the round bore 19 to be transformed, thereby extending urged portion, operating on the optical fiber 1a without excessive force and further ensuring fixing of the optical fiber 1a.

Bore 19 may be elliptical and elongated in the radial direction as illustrated in FIG. 5a or in the axial direction as illustrated in FIG. 5b.

Figure 7:
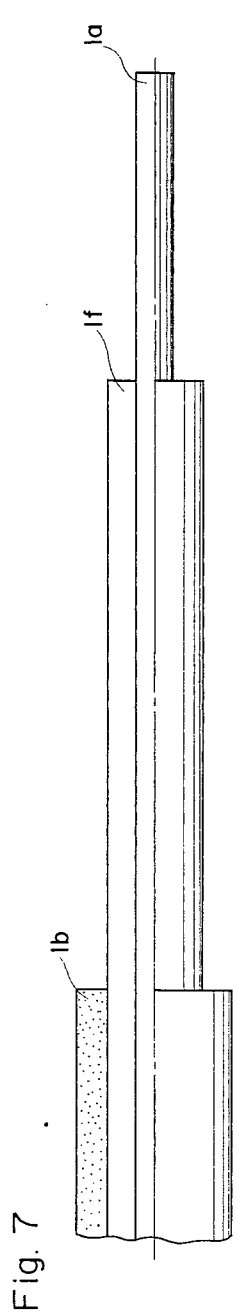
FIG. 7 is a half-sectional view of a third embodiment of the invention, showing a terminal of an optical fiber cord.
Figure 8:
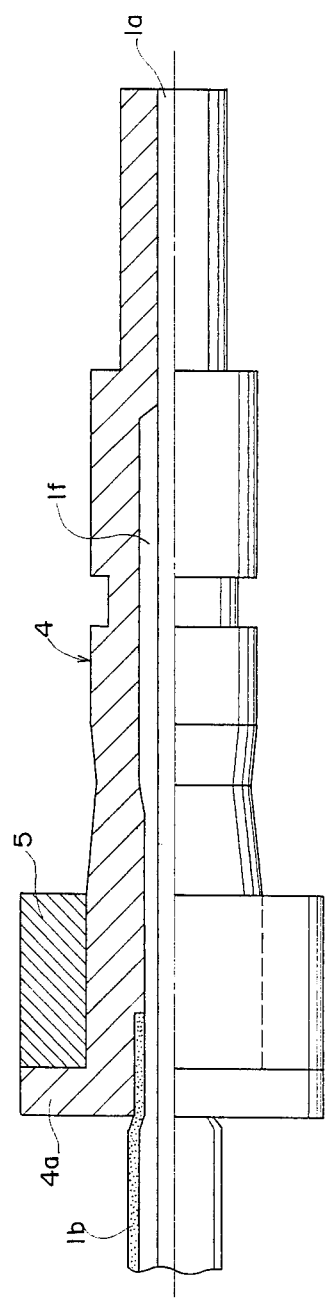
FIG. 8 is a half-sectional view of the third embodiment of the invention, showing a fixing state.

FIGS. 7 and 8 show a third embodiment of the invention in which an optical fiber cord 1 comprises a sheath 1e, fiber member 1d, a jacket 1b, a buffer layer 1f of synthetic resin and optical fiber 1a, the bared jacket 1b, buffer layer 1f and optical 1a, bared of the sheath 1e and the fiber member 1d are inserted into the ferrule 4, in which the jacket 1b to be inserted into the ferrule 4 is smaller in length than each slitting 4d. Also, the second embodiment is different from the first embodiment in that no screw thread is formed at the inner periphery of the base end of ferrule 4. A caulking tube 5 is fitted onto the base end of ferrule 4, thereby fixing the jacket 1b and buffer layer 1f to the optical fiber 1a.

In the third embodiment, the jacket 1b being encroached by the ferrule 4 is smaller in length than the slittings 4d, so that ferrule 4 compresses both the jacket 1b and the buffer layer 1f, thereby causing no slip between the jacket 1b and the buffer layer 1f, and fixing the optical fiber 1a.

Figure 9:
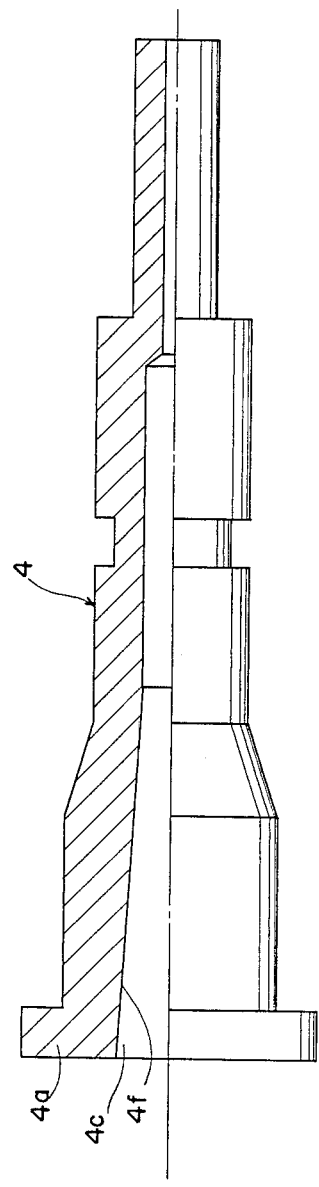
FIG. 9 is a half-sectional view of a ferrule in a fourth embodiment of the invention.
Figure 10:
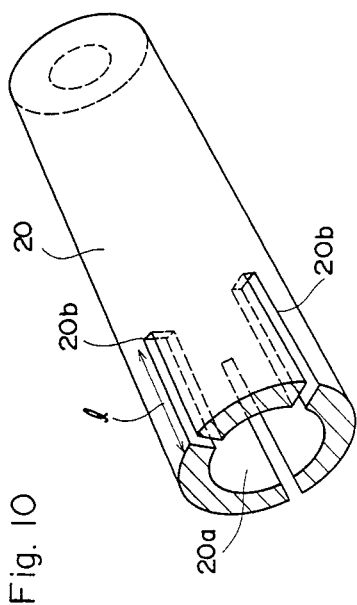
FIG. 10 is a perspective view of an inner tube at the fourth embodiment of the invention.
Figure 11:
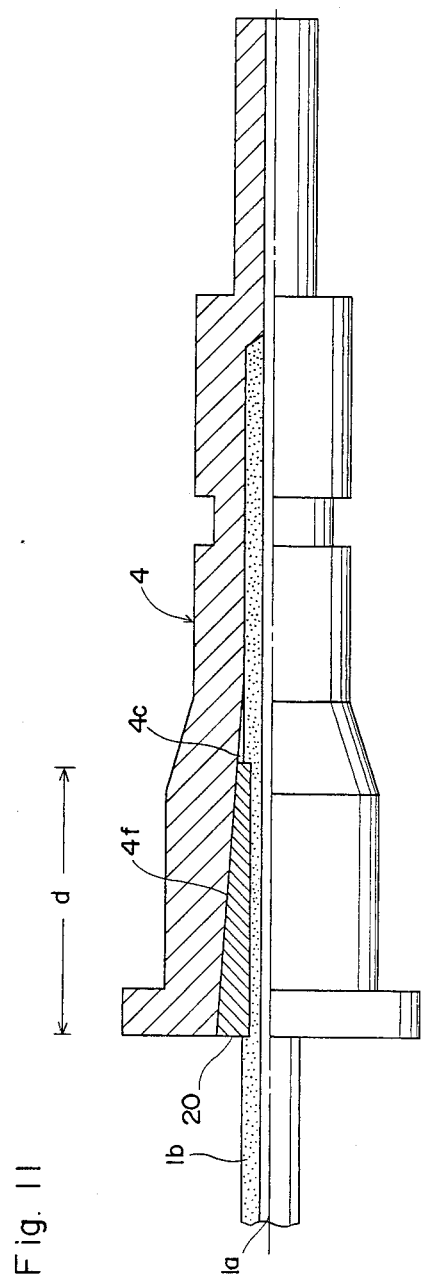
FIG. 11 is a half-sectional view of the fourth embodiment of the invention, showing its fixing state.

Referring to FIGS. 9, 10 and 11, a fourth embodiment of the invention is shown, in which the inner periphery of the base end of the ferrule 4 is formed a conical tapered portion 4f toward the fore end thereof. An inner tube 20 is truncated conical and tapered toward the utmost end thereof, has a bore 20a through which the optical fiber 1a and the jacket 1b are inserted, is slightly smaller in length than the tapered portion 4f at the ferrule 4, and has at the base end face divided equally into three to form slittings 20b of about ⅓ length of the tapered portion 4f.

In the state where the optical fiber 1a and jacket 1b are inserted into the bore 20a of the inner tube 20, the inner tube 20 is inserted into the through bore 4c at the ferrule 4 so that the tapered surface 4f is fitted onto the outer periphery of the inner tube 20. Hence, the inner tube 20 is reduced in an inner diameter so that the slittings 20b disappear to fix the jacket 1b to the optical fiber 1a.

In addition, in the fourth embodiment, the slittings 20b, being formed at the base end at the inner tube 20, is elongated in length l(in FIG. 10) to make larger the urged portion d (in FIG. 11), thereby forming the terminal construction largely withstanding the drawing force.

As this invention may be embodied in several forms without departing from the spirit of essential characteristics thereof, the present embodiment is therefore illustrative and not restrictive, since the scope of the invention is defined by the appended claims rather than by the description preceding them and all changes that fall within meets and bounds of the claims, or equivalence of such meets and bounds thereof are therefore intended to be embraced by the claims.

What is claimed is:

1. A connector for optical fiber provided at an end portion of an optical fiber cord, comprising an inner tube into which the end portion of said optical fiber cord being bared of a multiple cover is inserted, the bared end portion of said optical fiber cord comprising a bared jacket, and which inner tube has axial slittings being open at an end face thereof, said slittings surrounding a through bore for receiving the bared jacket, and an outer tube being fitted on the inner tube adjacent said slittings for fixing the bared jacket thereto, the portion of said inner tube onto which the outer tube is fixed having a cylindrical outer periphery and an inner surface of said outer tube which engages said cylindrical outer periphery of said inner tube being cylindrical, the outer tube having an inner diameter being smaller than an outer diameter of the inner tube adjacent the slittings in order to reduce the inner tube sufficient to grip the bared jacket.

2. A connector for optical fiber as set forth in claim 1, wherein said inner tube is a ferrule for fixing said optical fiber together with a jacket which forms the innermost layer of said cover.

3. A connector for optical fiber as set forth in claim 2, wherein a screw thread is formed at an inner peripheral surface of said inner tube.

4. A connector for optical fiber as set forth in claim 2, wherein at an end of said slittings is formed a bore having a diameter larger than a width of said slittings.

5. A connector for optical fiber as set forth in claim 4, wherein said bore is circular.

6. A connector for optical fiber as set forth in claim 4, wherein said bore is elliptical.

7. A connector for optical fiber as set forth in claim 2, wherein a screw thread is formed at an inner periphery of said inner tube and a bore having a diameter larger than a width of said slittings is formed at an end of said slittings.

8. A connector for optical fiber as set forth in claim 7, wherein said bore is circular.

9. A connector for optical fiber as set forth in claim 7, wherein said bore is elliptical.

10. A connector for optical fiber as set forth in claim 1, wherein said inner tube is a ferrule into which said end portion of the optical fiber together with a buffer layer and a jacket of said cover are inserted, the inner buffer layer being bared of the outer jacket, and the outer jacket being bared of another outer cover member.

11. A connector for optical fiber as set forth in claim 10, wherein a screw thread is formed at an inner periphery of said inner tube.

12. A connector for optical fiber as set forth in claim 10, wherein a bore having a diameter larger than a width of said slittings is formed at an end of said slittings.

13. A connector for optical fiber as set forth in claim 12, wherein said bore is circular.

14. A connector for optical fiber as set forth in claim 12, wherein said bore is elliptical.

15. A connector for optical fiber as set forth in claim 10, wherein a screw thread is formed at an inner periphery of said inner tube and a bore having a diameter larger than a width of said slittings is formed at an end of said slittings.

16. A connector for optical fiber as set forth in claim 15, wherein said bore is circular.

17. A connector for optical fiber as set forth in claim 15, wherein said bore is elliptical.

18. A terminal structure of an optical fiber cord which includes an optical fiber, a jacket, a fiber member and a sheath, characterized in that said jacket is bared of said fiber member and said optical fiber is bared of said jacket at one end thereof, said bared jacket in part and said bared optical fiber being inserted into an inner tube having formed therein axial slittings, said slittings surrounding a through bore formed in said inner tube for receiving said optical fiber and jacket, an outer tube being fitted onto said inner tube, thereby reducing the inner tube for fixing said optical fiber and jacket.

19. A connector for optical fiber as set forth in claim 18, wherein said outer tube is a ferrule, tapered at an inner periphery, and larger in axial length than said inner tube.

20. A connector for optical fiber as set forth in claim 19, wherein said inner tube is of a truncated conical construction.

21. A connector for optical fiber as set forth in claim 19, wherein said inner tube in part is of a truncated conical construction.

22. A terminal structure of an optical fiber cord which includes an optical fiber, a jacket, a fiber member and a sheath, characterized in that said jacket is bared of said fiber member and said optical fiber is bared of said jacket at one end thereof, said bared jacket in part and said bared optical fiber being inserted into an inner tube having formed therein axial slittings, said slittings surrounding a through bore formed in said inner tube for receiving said optical fiber and jacket, an outer tube being fitted onto said inner tube, thereby reducing the inner tube for fixing said optical fiber and jacket, said fiber member being bared of said sheath adjacent to the fixing portion of said optical fiber and jacket, a tubular member being interposed between said bared fiber member and said jacket, said bared fiber member in part being folded back on the sheath end, and a caulking member being fitted onto the folded-back fiber-member, thereby fixing said fiber member to said sheath.

* * * * *